United States Patent
Knox, II et al.

(10) Patent No.: US 9,404,488 B2
(45) Date of Patent: Aug. 2, 2016

(54) PRESSURIZED OIL DELIVERY SYSTEM FOR A RECIPROCATING AIR COMPRESSOR

(71) Applicant: WABTEC HOLDING CORP., Wilmerding, PA (US)

(72) Inventors: Steven J Knox, II, Pittsburgh, PA (US); Matthew D Mitsch, Pittsburgh, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 223 days.

(21) Appl. No.: 13/770,570

(22) Filed: Feb. 19, 2013

(65) Prior Publication Data
US 2014/0234134 A1 Aug. 21, 2014

(51) Int. Cl.
*F16H 57/04* (2010.01)
*F04B 39/02* (2006.01)

(52) U.S. Cl.
CPC .............. *F04B 39/02* (2013.01); *F04B 39/0207* (2013.01); *F04B 39/0261* (2013.01); *F16H 57/0434* (2013.01); *F16H 57/0435* (2013.01)

(58) Field of Classification Search
CPC .......... F16N 7/366; F04B 53/18; F04B 53/20; F04B 39/02; F04B 39/0207; F04B 39/0261; F04C 29/025; F04C 29/026; B01D 35/26; F16H 57/0434; F16H 57/0435
USPC ................. 184/6.16, 6.12, 7.4, 27.1
See application file for complete search history.

(56) References Cited

U.S. PATENT DOCUMENTS

| | | | | | |
|---|---|---|---|---|---|
| 2,515,153 | A | * | 7/1950 | Hornschuch | 184/6.28 |
| 3,295,507 | A | * | 1/1967 | Carter et al. | 123/196 A |
| 3,976,165 | A | * | 8/1976 | Pilarczyk | 184/6.16 |
| 3,993,094 | A | * | 11/1976 | Spooner | 137/588 |
| 4,245,575 | A | * | 1/1981 | Hsiao et al. | 112/256 |
| 4,366,837 | A | * | 1/1983 | Roettgen | 137/557 |
| 4,368,802 | A | * | 1/1983 | Grabill et al. | 184/6.12 |
| 4,836,123 | A | * | 6/1989 | Grinde et al. | 114/382 |
| 5,183,134 | A | | 2/1993 | Kuc | |
| 5,299,657 | A | * | 4/1994 | Hikes | 184/6.22 |
| 5,785,149 | A | * | 7/1998 | Luyts | 184/6.12 |
| 7,192,528 | B2 | * | 3/2007 | Prochaska et al. | 210/798 |
| 2003/0059310 | A1 | * | 3/2003 | Koenig et al. | 417/16 |
| 2009/0020468 | A1 | * | 1/2009 | Dannenmaier et al. | 210/232 |
| 2012/0118800 | A1 | * | 5/2012 | Lauer et al. | 210/136 |
| 2013/0294936 | A1 | * | 11/2013 | Worden et al. | 417/53 |

* cited by examiner

*Primary Examiner* — Minh Truong
(74) *Attorney, Agent, or Firm* — The Webb Law Firm

(57) ABSTRACT

A pressurized oil delivery system for a reciprocating air compressor includes an oil pump having an inlet port connected to an oil pickup tube and an outlet port connected to a filter inlet tube and a user interface panel mounted to a crankcase of the air compressor. The filter inlet tube may be connected to an oil filter assembly supported on an exterior face of the user interface panel. A pressure regulating valve may be provided in line in the filter inlet tube upstream of the oil filter assembly. An oil fill port may be located on the user interface panel. An oil level indicator may be connected to an oil level indicator tube passing through and supported by the user interface panel. An oil pressure measurement port may be provided on the user interface panel.

24 Claims, 8 Drawing Sheets

PRESSURIZED OIL DELIVERY SYSTEM FOR A RECIPROCATING AIR COMPRESSOR

BACKGROUND OF THE INVENTION

1. Field of the Invention

This disclosure relates generally to lubrication systems and, more particularly, to an air compressor lubrication system for use on a railway vehicle.

2. Description of Related Art

Lubrication systems for railway vehicle air compressors are well known and have remained virtually unchanged since the 1940s. Despite some advances in maintenance and inspection methods to ensure trouble-free operation of the lubrication systems, easy operator access to air compressor components for maintenance or to address failure of system components has been a continuing problem.

Currently known lubrication systems utilized in many air compressors rely upon moving oil to wear areas of the air compressor using an oil distribution ring mounted on and circumscribed about the air compressor crankshaft. Such distribution rings are fed oil through delivery means such as a flexible transfer line to an inlet on the distribution ring. An example of one such configuration is described in U.S. Pat. No. 5,183,134 to Kuc, incorporated herein by reference in its entirety. In operation, the combination of a flexible transfer line and vibrations caused by oscillating and reciprocating components of the air compressor result in undesired movement (e.g., rotation) of the distribution ring on the crankshaft and subsequent fatigue failure of the flexible transfer line and other components directly and indirectly contacting and communicating with the crankshaft.

Many conventional lubricating systems also utilize oil filtration modules attached to the exterior of the air compressor. Such systems, as described in U.S. Pat. No. 5,183,134 to Kuc, seek to address efficient removal of wear inducing particulate matter from oils while at the same time providing easy access to the filter for inspection and maintenance. However, this arrangement does not allow for easy maintenance and inspection of other system components such as oil fill, oil pressure, and oil level, especially in those instances where a locomotive does not provide access to both sides of the air compressor.

Another problem with conventional compressor lubrication systems is that despite having means for relieving fluid pressure when safe operational limits are exceeded, such conventional systems do not provide dynamic closed-loop regulation of the oil system pressure. Conventional compressor lubrication systems provide for excess fluid pressure to be released externally from the air compressor, but fail to provide an arrangement that allows the excess fluid pressure to be used in a closed-loop configuration within the air compressor.

SUMMARY OF THE INVENTION

In one embodiment, an air compressor comprising a pressurized oil delivery system is provided. The air compressor generally comprises a crankcase, a rotatable crankshaft journaled for rotation to the crankcase, and at least two piston-cylinders driven by the rotatable crankshaft. The pressurized oil delivery system generally comprises an oil pump comprising an inlet port connected to an oil pickup tube, and a port outlet connected to a filter inlet tube. A user interface panel is mounted to the crankcase. The filter inlet tube may be connected to an oil filter assembly supported on an exterior face of the user interface panel. A pressure regulating valve may be provided in line in the filter inlet tube upstream of the oil filter assembly. An oil fill port may be located on the user interface panel. An oil level indicator may be connected to an oil level indicator tube passing through and supported by the user interface panel. An oil pressure measurement port may be provided on the user interface panel.

The user interface panel may be removably connected to the crankcase of the air compressor. A pump drive gear may be provided on the crankshaft and the oil pump may further comprise a drive gear meshed with the pump drive gear, whereby the rotatable crankshaft drives the oil pump.

The oil filter assembly may comprise a removable oil filter. The pressure measurement port is located upstream of the removable oil filter. The pressure measurement port may be adapted to connect to a pressure gauge.

An oil filter distribution tube may be connected to an outflow port of the oil filter assembly. An oil pressure measurement distribution tee may be connected to the oil filter distribution tube to direct pressurized oil through an oil pressure indicator connection tube adapted for connection to a pressure gauge. The oil filter distribution tube may be a rigid tube.

The pressure regulating member may be a spring loaded oil pressure relief valve.

Further details and advantages will be understood from the following detailed description read in conjunction with the accompanying drawings.

DESCRIPTION OF THE PREFERRED EMBODIMENTS

For purposes of the description hereinafter, spatial orientation terms, as used, shall relate to the referenced embodiment as it is oriented in the accompanying drawing, figures, or otherwise described in the following detailed description. However, it is to be understood that the embodiments described hereinafter may assume many alternative variations and configurations. It is also to be understood that the specific components, devices, features, and operational sequences illustrated in the accompanying drawing, figures, or otherwise described herein are simply exemplary and should not be considered as limiting.

Figure 1:
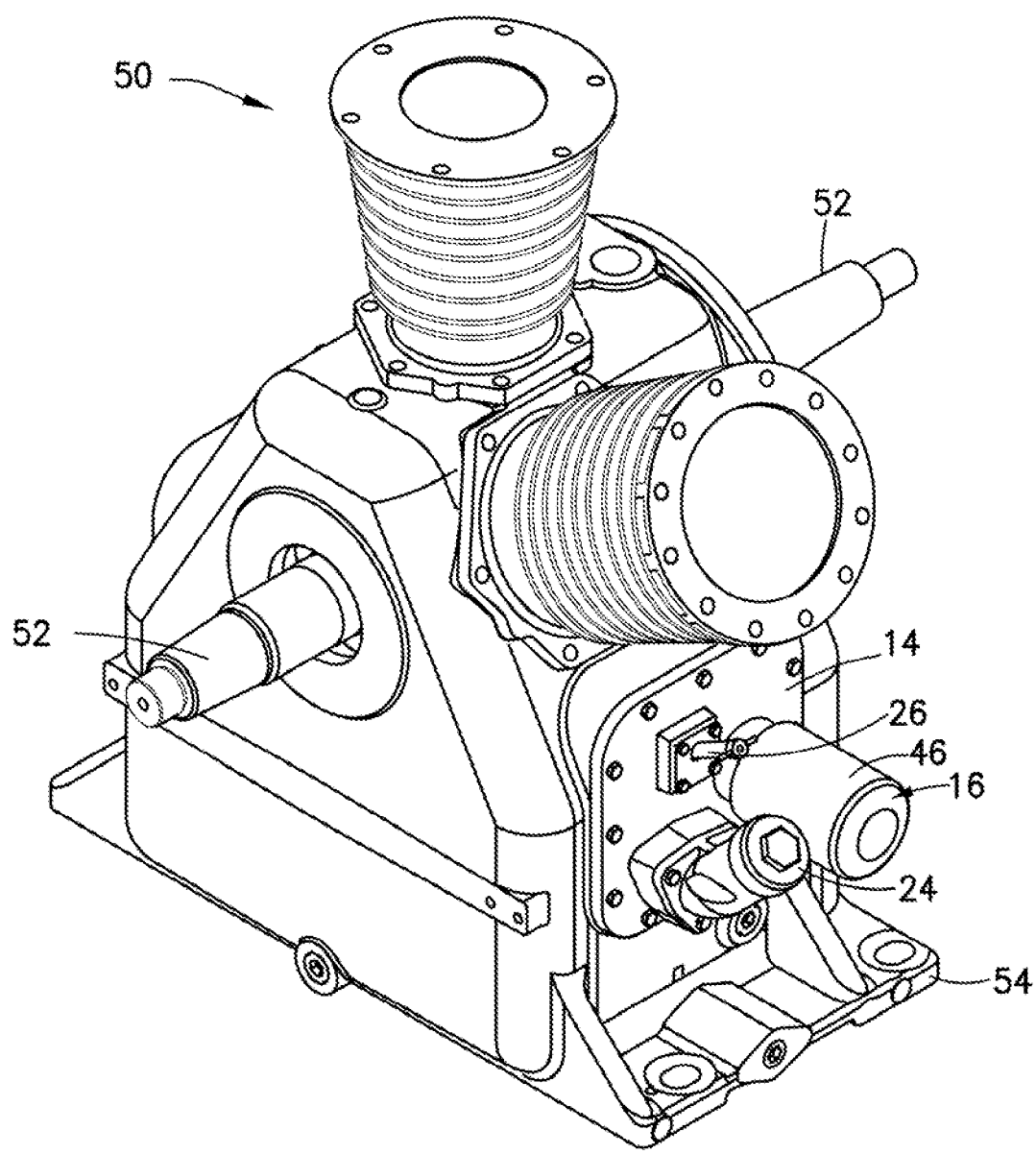
FIG. 1 is a perspective view of an air compressor which utilizes a pressurized oil delivery system in accordance with this disclosure.
Figure 4:
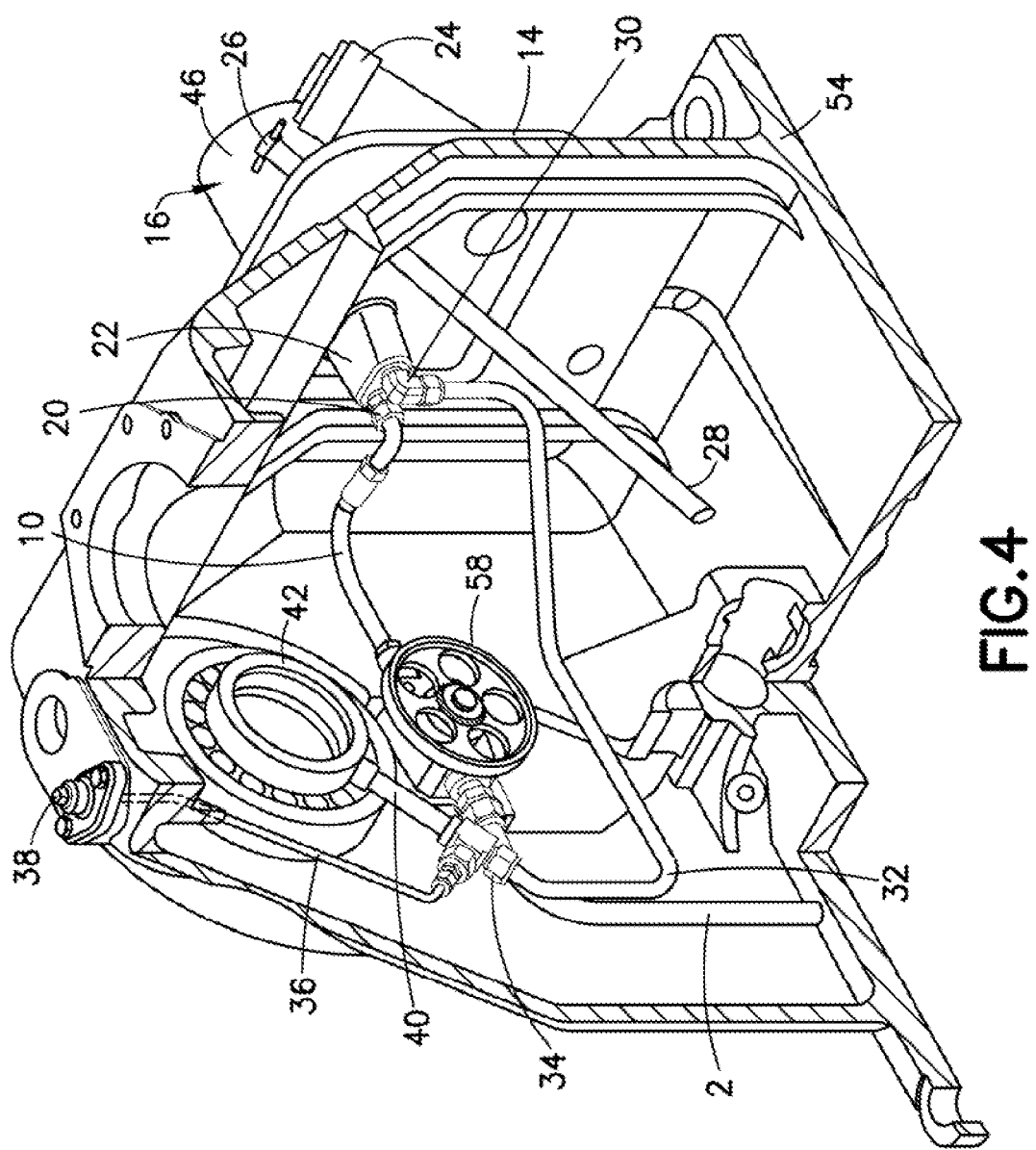
FIG. 4 is a perspective and partially cut away view of the pressurized oil delivery system located within a crankcase of the air compressor shown in FIG. 1.

Referring to FIGS. 1 and 4, an air compressor 50 is operated by means of a central crankshaft 52 positioned in a crankcase 54 having an internal chamber. The air compressor 50 is a multi-cylinder air compressor comprising at least two piston-cylinders, but different configurations for the air compressor 50 are contemplated. Whenever the air compressor 50 is in operation, the central crankshaft 52 is rotated by any appropriate power source (not shown), including, but not limited to, an electric motor or diesel locomotive engine. Rotation of the crankshaft 52 causes the piston-cylinders to move in a reciprocating manner, thereby compressing air that is drawn into the air compressor 50. By rotating the crankshaft 52, which is operatively connected to a pressurized oil delivery system described in detail hereinafter, lubricating fluid is continuously pumped to areas within the air compressor 50 that experience substantial amounts of wear. The pressurized oil delivery system can be fitted to new air compressors, or retrofitted to existing air compressors.

Figure 2A:
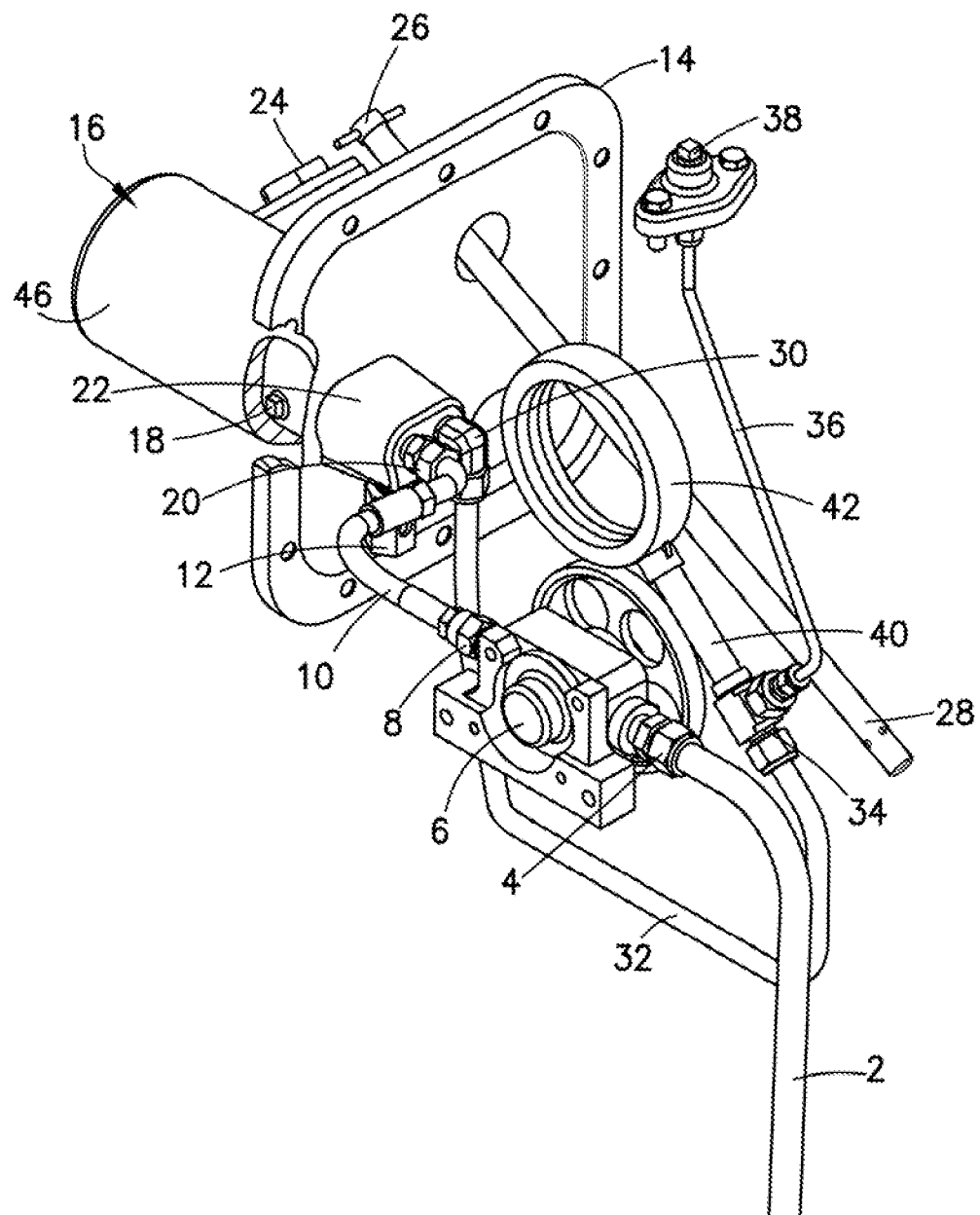
FIG. 2A is a perspective view showing the pressurized oil delivery system of FIG. 1.
Figure 2B:
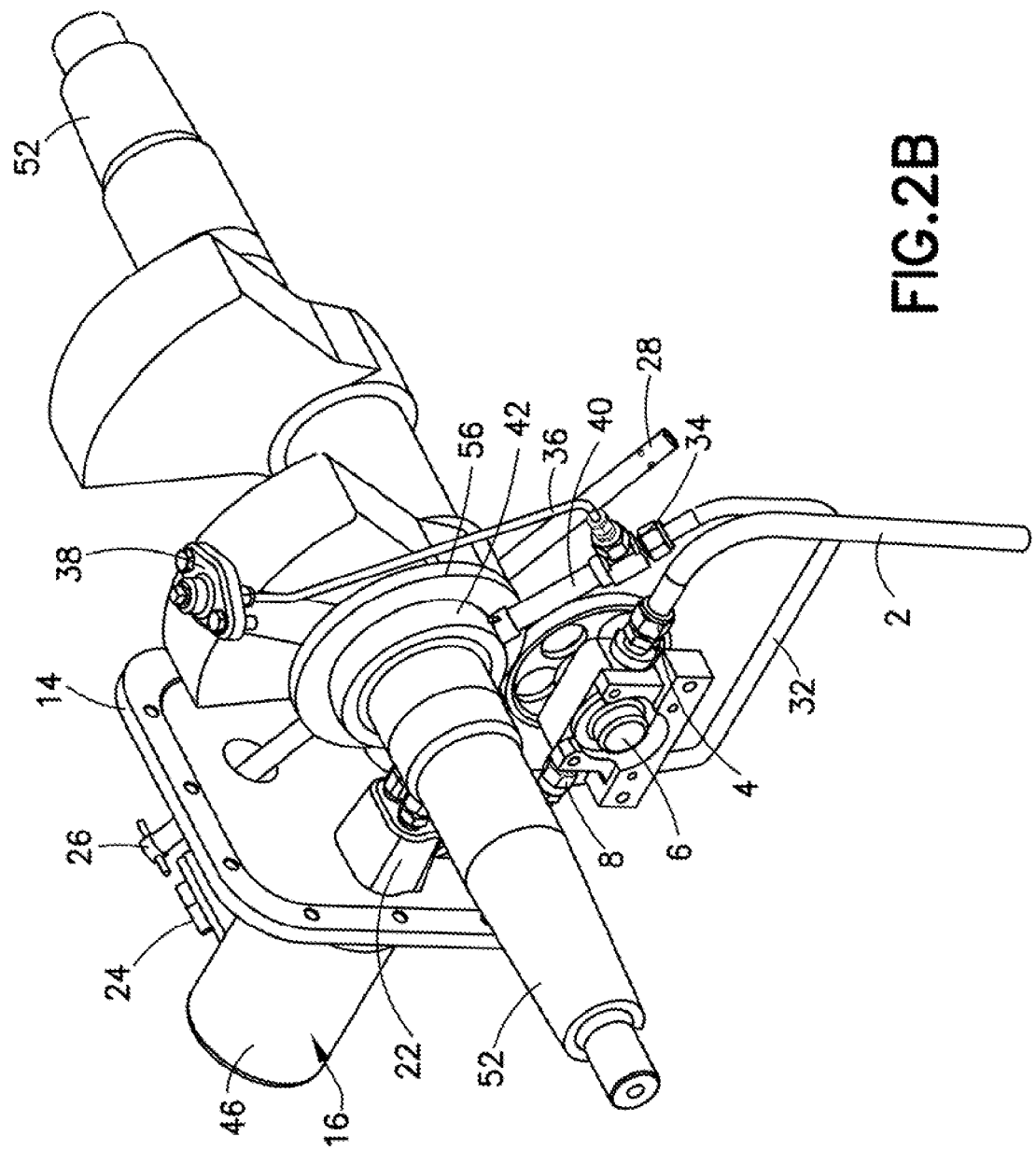
FIG. 2B is a perspective view showing the pressurized oil delivery system and components of the air compressor shown in FIG. 1.
Figure 3:
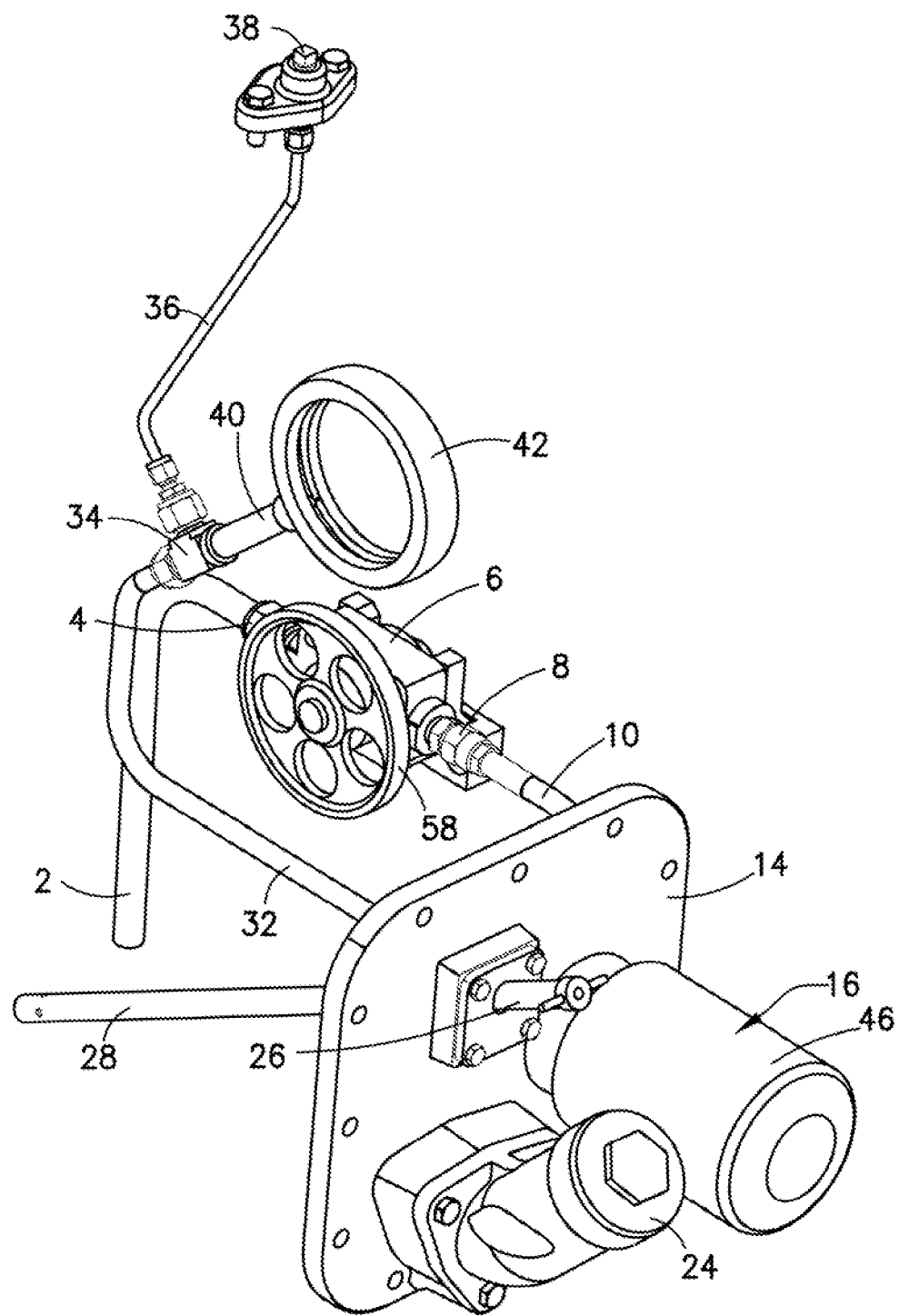
FIG. 3 is another perspective view showing the pressurized oil delivery system of FIG. 2A.

Referring further to FIGS. 2A, 2B, and 3, the crankshaft 52 drives a crankshaft oil pump drive gear 56. The crankshaft oil pump drive gear 56 transfers power to a positive displacement oil pump 6 via a mating and intermeshed oil pump drive gear 58. Oil is drawn in the oil pump 6 by suction from an oil reservoir (not shown) through an oil pickup tube 2. The oil enters the oil pump 6 through an oil pump inlet port 4. Oil exits the pump 6 through an oil pump outlet port 8 under pressure. An oil filter assembly inlet tube 10 directs the pressurized oil to a pressure regulating valve 12. After passing through the pressure regulating valve 12, the pressurized oil is directed through an oil pressure measurement port 18.

The pressure regulating valve 12, as best shown in FIG. 2A, is, for example, a spring-loaded oil pressure relief valve. Use of the pressure regulating valve 12 provides both continual delivery system pressure adjustment and removal of oil pressure flow which exceeds a desired oil delivery system pressure set point. The use of the pressure regulating valve 12 serves to protect components of the oil delivery system from fluid pressure that exceeds safe operational limits while also assuring that the system pressure stays within an acceptable range of the desired pressure set point. When the oil delivery system pressure exceeds the desired pressure set point, the pressure regulating valve 12 releases the excess pressurized oil to bring the system pressure back to the desired pressure set point.

Pressurized oil exits the pressure regulating valve 12 and enters an oil filter assembly 16 via an oil filter assembly inlet port 20 as shown in FIGS. 3 and 4. The oil filter assembly 16 may be comprised of an internal filter element and an external filter case. Alternatively, as illustrated, the oil filter assembly 16 may include a unitary-type oil filter element 46 which can be replaced as an entire unit. The oil filter element 46 may also be any suitable type of spin-on filter that is commonly used to provide particulate removal from oils. The oil filter assembly inlet port 20 and an oil filter assembly outlet port 30 are both positioned in an oil filter assembly housing 22. The oil filter element 46 is positioned on the front face of a user interface panel 14. As further described hereinafter, the user interface panel 14 is removable to allow easy access to the crankcase to service the oil delivery system and to allow easy access to the internal components of the air compressor 50 for maintenance and inspection.

The user interface panel 14 comprises or supports an oil fill port 24, an oil level indicator 26, the oil pressure measurement port 18, and the oil filter element 46, which are all positioned on the exterior side of the user interface panel 14. In the depicted embodiment, the oil filter element 46 is positioned on the right side of the user interface panel 14, the oil fill port 24 is positioned on the peripheral edge of the bottom left side of the user interface panel 14, and the oil level indicator 26 is positioned on the peripheral edge of the top left side of the user interface panel 14 as viewed from the front of the user interface panel. However, variations of this arrangement on the user interface panel 14 are possible and the depicted arrangement should not be deemed as limiting. The user interface panel 14 is removably attached to an exterior side of the crankcase 54 through the use of bolts, screws, or any type of mechanical fasteners which allow the user interface panel 14 to be easily removed and attached by a user. By using the configuration of the user interface panel 14 as discussed above, a user is provided easy access to the pressurized oil delivery system for oil system maintenance, inspection, and monitoring. Additionally, the user interface panel 14 may be removed to allow access to other system components inside the crankcase 54. Removal of the user interface panel 14 not only facilitates installation of the pressurized oil delivery system, but also creates an access port which can then be used for maintenance or inspection of the pressurized oil delivery system and the air compressor 50.

For example, by utilizing the pressure measurement port 18, a pressure gauge can be used to ascertain the overall oil delivery system pressure level prior to the pressurized oil entering the oil filter assembly 16. The oil pressure measurement port 18 is operatively located upstream of the oil filter assembly 16. The oil level indicator 26, also positioned on the user interface panel 14, is used to check the level and amount of oil in the reservoir of the delivery system. An end of an oil level indicator tube 28 is positioned in the oil reservoir of the delivery system, which allows an oil level indicator member (not shown), such as a dipstick or a liquid level sight gauge, to be positioned therein. By opening the oil level indicator 26, the user can remove the oil level indicator member to determine the oil level in the oil reservoir. When the user determines that the oil level is low, the reservoir can be filled by using the oil fill port 24 located on the user interface panel 14. The oil fill port 24 opens into the oil reservoir through an opening on the interior face of the user interface panel 14.

With continued reference to FIGS. 2A and 3, pressurized oil exits the oil filter assembly 16 via the oil filter assembly outlet port 30 and is directed through an oil filter distribution tube 32. In one embodiment, the oil filter distribution tube 32 is rigid, such as being made from a tubular metal member. The oil filter distribution tube 32 may be comprised of a single tube or a plurality of tubes, and is operatively connected to an oil pressure measurement distribution tee 34. An oil distribution ring 42 is connected to the pressure measurement distribution tee 34, and the position of the oil distribution ring 42 is controlled by the location of the rigid oil filter distribution tube 32. The rigid oil filter distribution tube 32 and the pressure measurement distribution tee 34 also limit the rotation of the oil distribution ring 42. By controlling the position and rotation of the oil distribution ring 42, the potential for high cycle fatigue failure is reduced.

During operation of the air compressor 50, pressurized oil is directed through the oil pressure measurement distribution tee 34. The oil pressure measurement distribution tee 34 is further connected to an oil pressure indicator tube 36, and pressurized oil passes through the oil pressure indicator connection tube 36 to a pressure indicator connection port 38. Thus, the pressurized oil is present in the oil pressure indicator connection tube 36, and a user may attach an instrument (not shown), such as a pressure gauge, to the pressure indicator connection port 38 for measurement of oil delivery system pressure, flow rate, and additional characteristics of the pressurized oil. The oil pressure indicator port 38 is operatively located downstream of the oil filter assembly 16. The pressure indicator connection port 38 may be exposed on the crankcase 54 for attachment of a pressure gauge, and the oil pressure indicator connection tube 36 is located behind the user interface panel 14 to that the oil pressure indicator connection tube 36 can be easily accessed by removal of the user interface panel 14. By positioning the oil pressure measurement port 18 and the oil pressure indicator port 38 at these specified locations, a user can verify the system pressure exiting the oil pump 6 before entry into the oil filter assembly 16 and, likewise, verify system pressure after exiting the oil filter assembly 16 before entry into the oil distribution ring 42. Further, during operation of the air compressor 50, pressurized oil is directed through the oil distribution ring tube 40 to the oil distribution ring 42, which is attached to the crankshaft 52 of the air compressor 50 via a slip fit. The oil distribution ring 42 dispenses the pressurized oil to the crankshaft 52 of the air compressor 50 as is known in the air compressor field.

Figure 5:
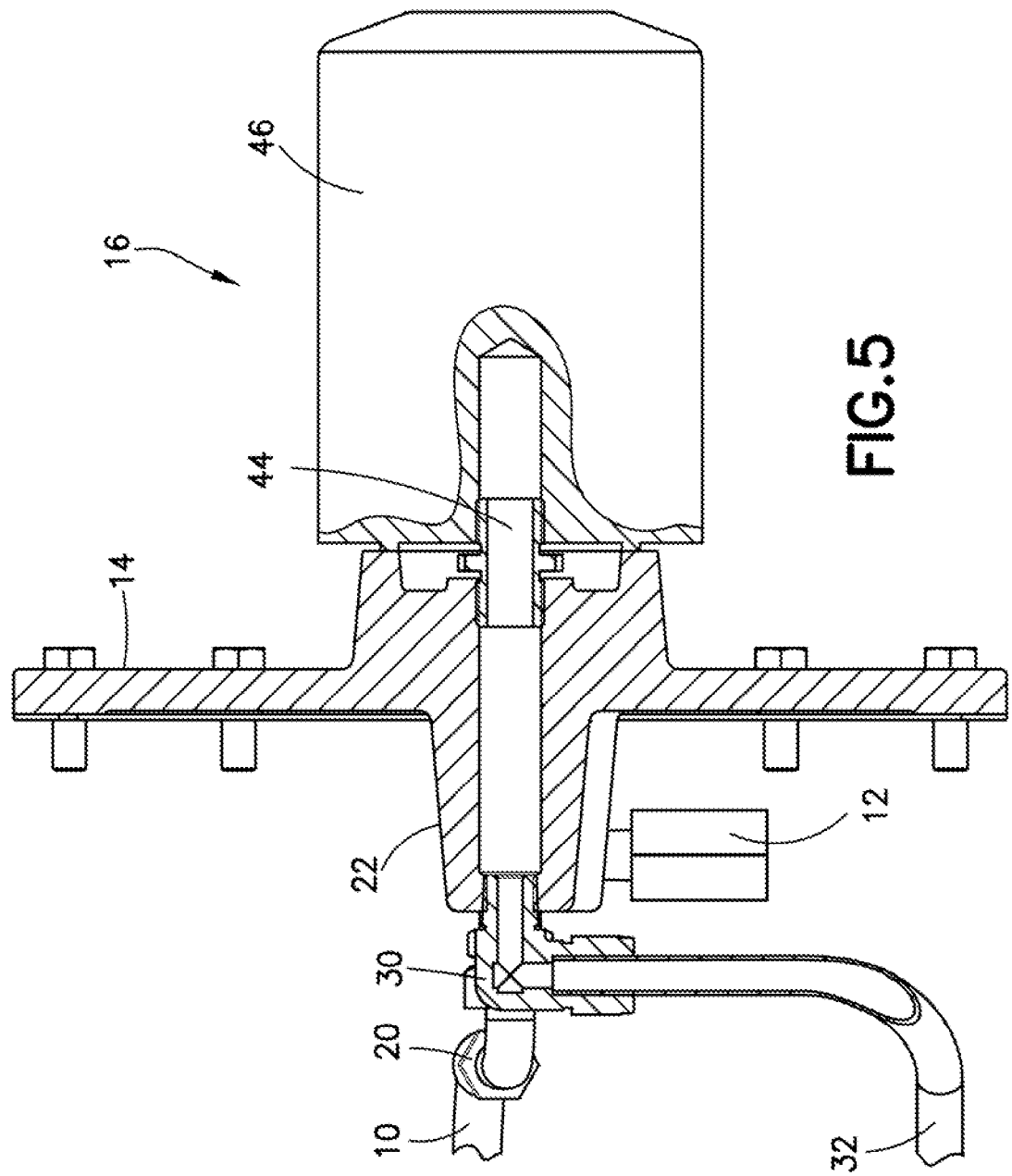
FIG. 5 is a cross-sectional view of an oil filter assembly and user interface panel in accordance with this disclosure.

FIG. 5 provides a cross-sectional view of the oil filter assembly 16 and the connection between the oil filter element 46 and the user interface panel 14. In one embodiment, the oil filter element 46 is a spin-on filter, which allows a user to easily remove and replace the oil filter element 46 whenever needed. The user interface panel 14 includes a threaded inner cavity, which receives a threaded oil filter assembly connection port 44. By placing the oil filter element 46 on the front of the user interface panel 14, a user can replace the oil filter element 46 without having to access the internal components of the air compressor 50 or the oil delivery system. This feature makes routine maintenance of the air compressor 50 and the oil delivery system easier, thereby promoting an increased length of operation for the air compressor 50.

Figure 6:
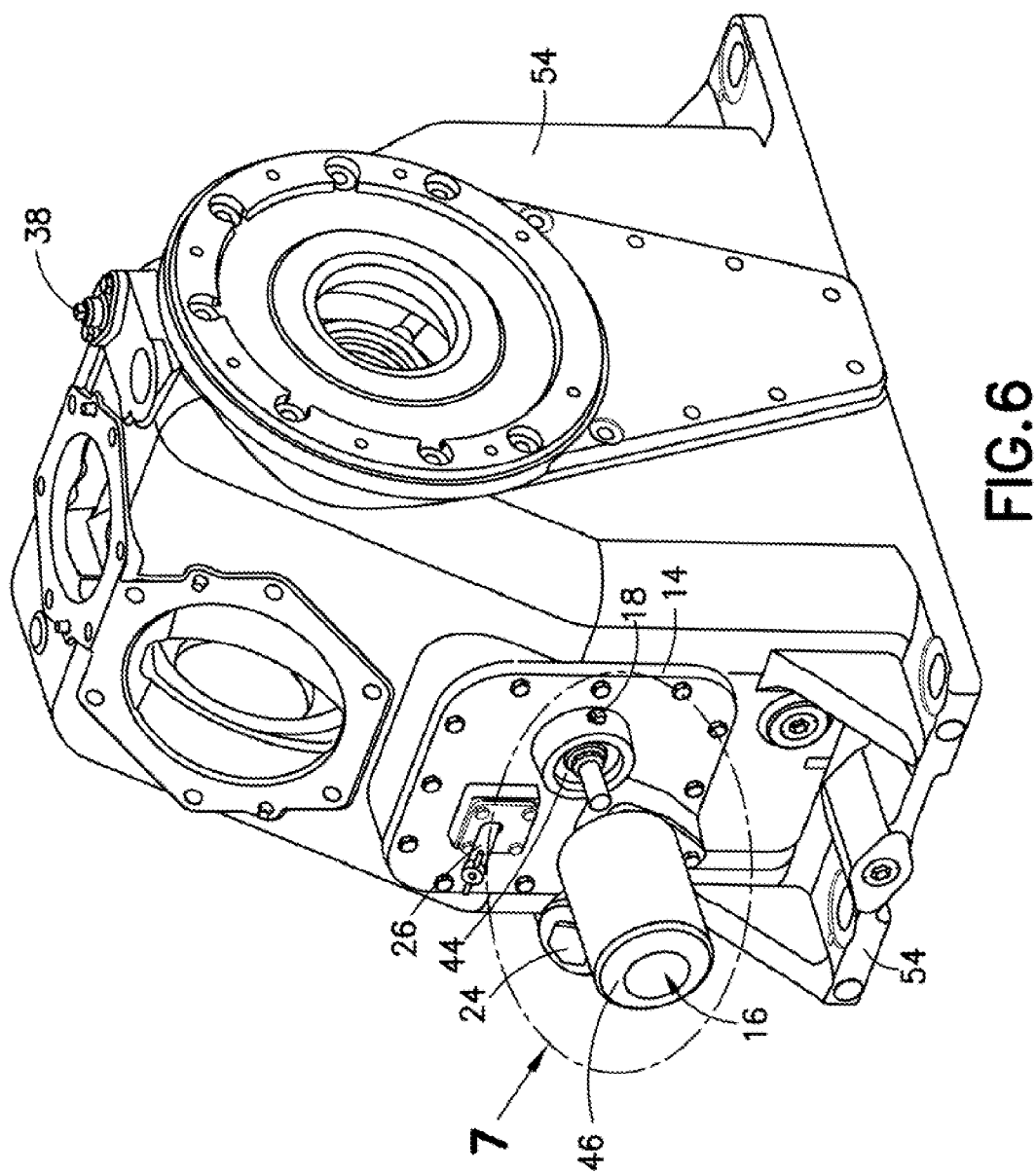
FIG. 6 is a perspective view showing the crankcase of the air compressor shown in FIG. 1 and certain components of the pressurized oil delivery system.

FIG. 6 shows the air compressor 50 with the oil filter element 46 detached from the oil filter assembly connection port 44. From FIG. 6, it can be seen that a user can easily access the oil filter element 46 and replace the oil filter element 46 relatively quickly. Additionally, the oil pressure indicator port 38 is shown on the exterior of the air compressor crankcase 54, as mentioned previously. A user can connect a pressure gauge to this oil pressure indicator port 38 to ascertain the oil pressure level downstream of the oil filter assembly 16. By providing this external oil pressure indicator port 38, the user can maintain and monitor the oil pressure in the air compressor 50 to ensure the pressurized oil delivery system is operating safely.

Figure 7:
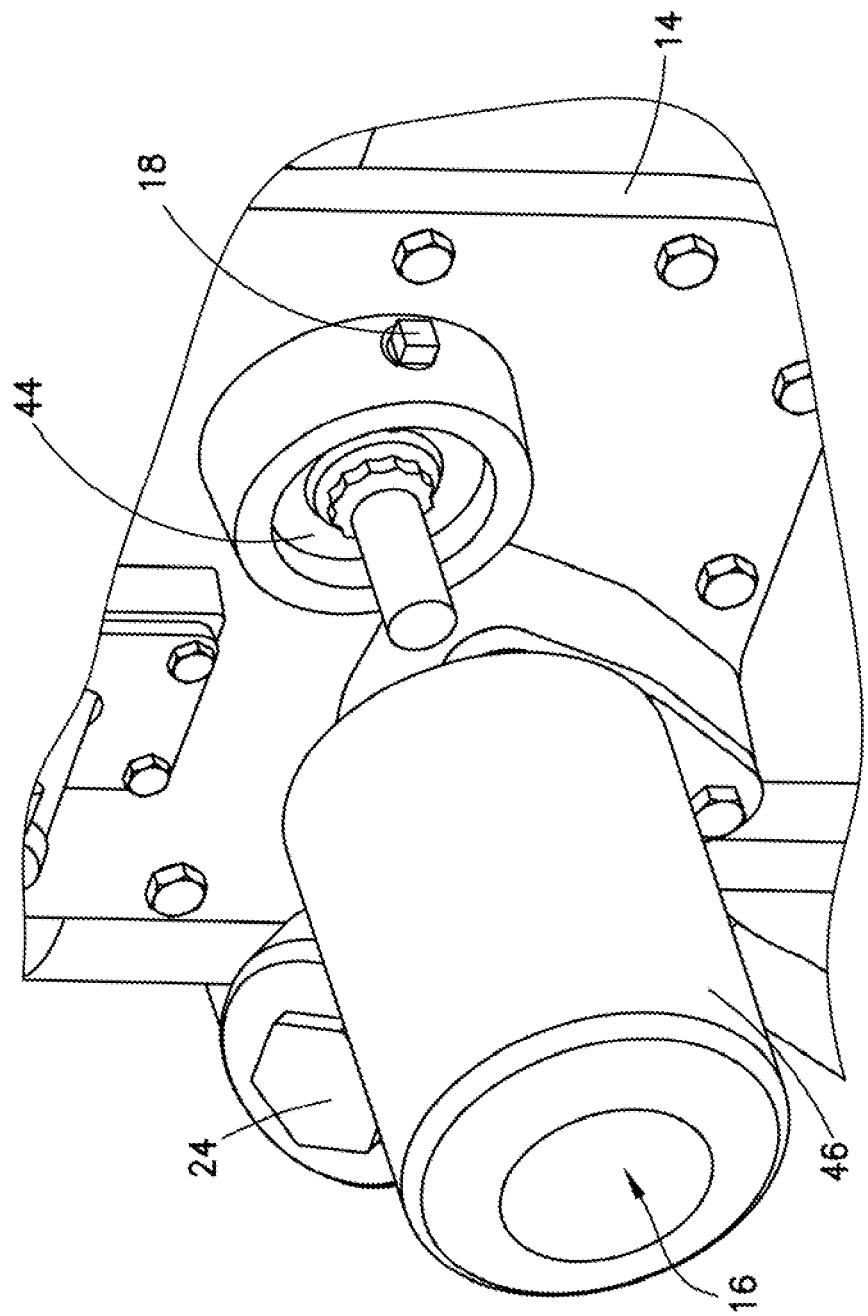
FIG. 7 is a detail view of Detail 7 in FIG. 6.

FIG. 7 is detail view of a portion of air compressor crankcase 54 shown in FIG. 6. The oil filter element 46 is shown detached from the oil filter assembly connection port 44. By threading the oil filter element 46 onto the oil filter assembly connection port 44, the oil filter assembly is quickly and easily replaced. The lateral oil pressure measurement port 18 is also shown. This oil pressure measurement port 18 can be used by an operator to connect a pressure gauge to evaluate the oil pressure of the pressurized oil delivery system upstream of the oil filter assembly 16. This can be done to assess the pressure of the oil being directed from the oil pump 6, so that the user can maintain consistency in the pressurized oil delivery system.

While an embodiment of a pressurized oil delivery system for a reciprocating air compressor is shown in the accompanying figures and described hereinabove in detail, other embodiments will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A pressurized oil delivery system for a reciprocating air compressor, comprising:
an oil pump comprising an inlet port connected to an oil pickup tube and an outlet port connected to a filter inlet tube;
a user interface panel, the filter inlet tube connected to an oil filter assembly supported on an exterior face of the user interface panel;
a pressure regulating valve in line in the filter inlet tube upstream of the oil filter assembly;
an oil fill port located on the user interface panel;
an oil level indicator connected to an oil level indicator tube passing through and supported by the user interface panel;
an oil pressure measurement port on the user interface panel,
an oil distribution ring fluidly connected to the oil filter assembly, wherein the oil distribution ring is immovable relative to a crankshaft on which the oil distribution ring is provided, and
an oil filter distribution tube connected to an outflow port of the oil filter assembly and the oil distribution ring, wherein the oil filter distribution tube is a rigid tube, wherein an oil filter assembly housing is formed integral with the user interface panel and a portion of the oil filter assembly housing extends inwardly from an interior face of the user interface panel, and wherein the pressure regulating valve is mounted to the portion of the oil filter assembly housing that extends from the interior face of the user interface panel.

2. The pressurized oil delivery system as claimed in claim 1, wherein an oil pressure measurement distribution tee is connected to the oil filter distribution tube to direct pressurized oil through an oil pressure indicator connection tube adapted for connection to a pressure gauge.

3. The pressurized oil delivery system as claimed in claim 1, wherein the user interface panel is adapted for removable connection to a crankcase of the air compressor.

4. The pressurized oil delivery system as claimed in claim 1, wherein the air compressor further comprises a rotatable crankshaft having a pump drive gear and the oil pump comprises a drive gear meshed with the pump drive gear, whereby the rotatable crankshaft drives the oil pump.

5. A pressurized oil delivery system for a reciprocating air compressor, comprising:
an oil pump comprising an inlet port connected to an oil pickup tube and an outlet port connected to a filter inlet tube;
a user interface panel, the filter inlet tube connected to an oil filter assembly supported on an exterior face of the user interface panel;
a pressure regulating valve in line in the filter inlet tube upstream of the oil filter assembly to direct oil through the pressure regulating valve before entering the oil filter assembly;
an oil fill port located on the user interface panel;
an oil level indicator connected to an oil level indicator tube passing through and supported by the user interface panel; and
an oil pressure measurement port on the user interface panel,
wherein an oil filter assembly housing is formed integral with the user interface panel and a portion of the oil filter assembly housing extends inwardly from an interior face of the user interface panel, and
wherein the pressure regulating valve is mounted to the portion of the oil filter assembly housing that extends from the interior face of the user interface panel.

6. The pressurized oil delivery system as claimed in claim 5, wherein the user interface panel is adapted for removable connection to a crankcase of the air compressor.

7. The pressurized oil delivery system as claimed in claim 5, wherein the air compressor further comprises a rotatable crankshaft having a pump drive gear and the oil pump comprises a drive gear meshed with the pump drive gear, whereby the rotatable crankshaft drives the oil pump.

8. The pressurized oil delivery system as claimed in claim 5, wherein the oil filter assembly comprises a removable oil filter.

9. The pressurized oil delivery system as claimed in claim 8, wherein the pressure measurement port is located upstream of the removable oil filter.

10. The pressurized oil delivery system as claimed in claim 9, wherein the oil pressure measurement port is adapted to connect to a pressure gauge.

11. The pressurized oil delivery system as claimed in claim 5, further comprising an oil filter distribution tube connected to an outflow port of the oil filter assembly.

12. The pressurized oil delivery system as claimed in claim 11, wherein an oil pressure measurement distribution tee is connected to the oil filter distribution tube to direct pressurized oil through an oil pressure indicator connection tube adapted for connection to a pressure gauge.

13. The pressurized oil delivery system as claimed in claim 11, wherein the oil filter distribution tube is a rigid tube.

14. The pressurized oil delivery system as claimed in claim 5, wherein the pressure regulating valve is a spring loaded oil pressure relief valve.

15. An air compressor, comprising:
a crankcase;
a rotatable crankshaft journaled for rotation to the crankcase;
at least two piston-cylinders driven by the rotatable crankshaft; and
a pressurized oil delivery system, comprising:
an oil pump comprising an inlet port connected to an oil pickup tube and an outlet port connected to a filter inlet tube;
a user interface panel mounted to the crankcase, the filter inlet tube connected to an oil filter assembly supported on an exterior face of the user interface panel;
a pressure regulating valve in line in the filter inlet tube upstream of the oil filter assembly to direct oil through the pressure regulating valve before entering the oil filter assembly;
an oil fill port located on the user interface panel;
an oil level indicator connected to an oil level indicator tube passing through and supported by the user interface panel; and
an oil pressure measurement port on the user interface panel,
wherein an oil filter assembly housing is formed integral with the user interface panel and a portion of the oil filter assembly housing extends inwardly from an interior face of the user interface panel, and
wherein the pressure regulating valve is mounted to the portion of the oil filter assembly housing that extends from the interior face of the user interface panel.

16. The air compressor as claimed in claim 15, wherein the user interface panel is removably connected to the crankcase of the air compressor.

17. The air compressor as claimed in claim 15, further comprising a pump drive gear on the crankshaft and the oil pump further comprises a drive gear meshed with the pump drive gear, whereby the rotatable crankshaft drives the oil pump.

18. The air compressor as claimed in claim 15, wherein the oil filter assembly comprises a removable oil filter.

19. The air compressor as claimed in claim 18, wherein the pressure measurement port is located upstream of the removable oil filter.

20. The air compressor as claimed in claim 19, wherein the pressure measurement port is adapted to connect to a pressure gauge.

21. The air compressor as claimed in claim 15, further comprising an oil filter distribution tube connected to an outflow port of the oil filter assembly.

22. The air compressor as claimed in claim 21, wherein an oil pressure measurement distribution tee is connected to the oil filter distribution tube to direct pressurized oil through an oil pressure indicator connection tube adapted for connection to a pressure gauge.

23. The air compressor as claimed in claim 21, wherein the oil filter distribution tube is a rigid tube.

24. The air compressor as claimed in claim 15, wherein the pressure regulating valve is a spring loaded oil pressure relief valve.

* * * * *